May 7, 1968  S. C. WELLS  3,381,336
MELT SPINNING EXTRUSION HEAD SYSTEM
Filed June 20, 1966  3 Sheets-Sheet 3

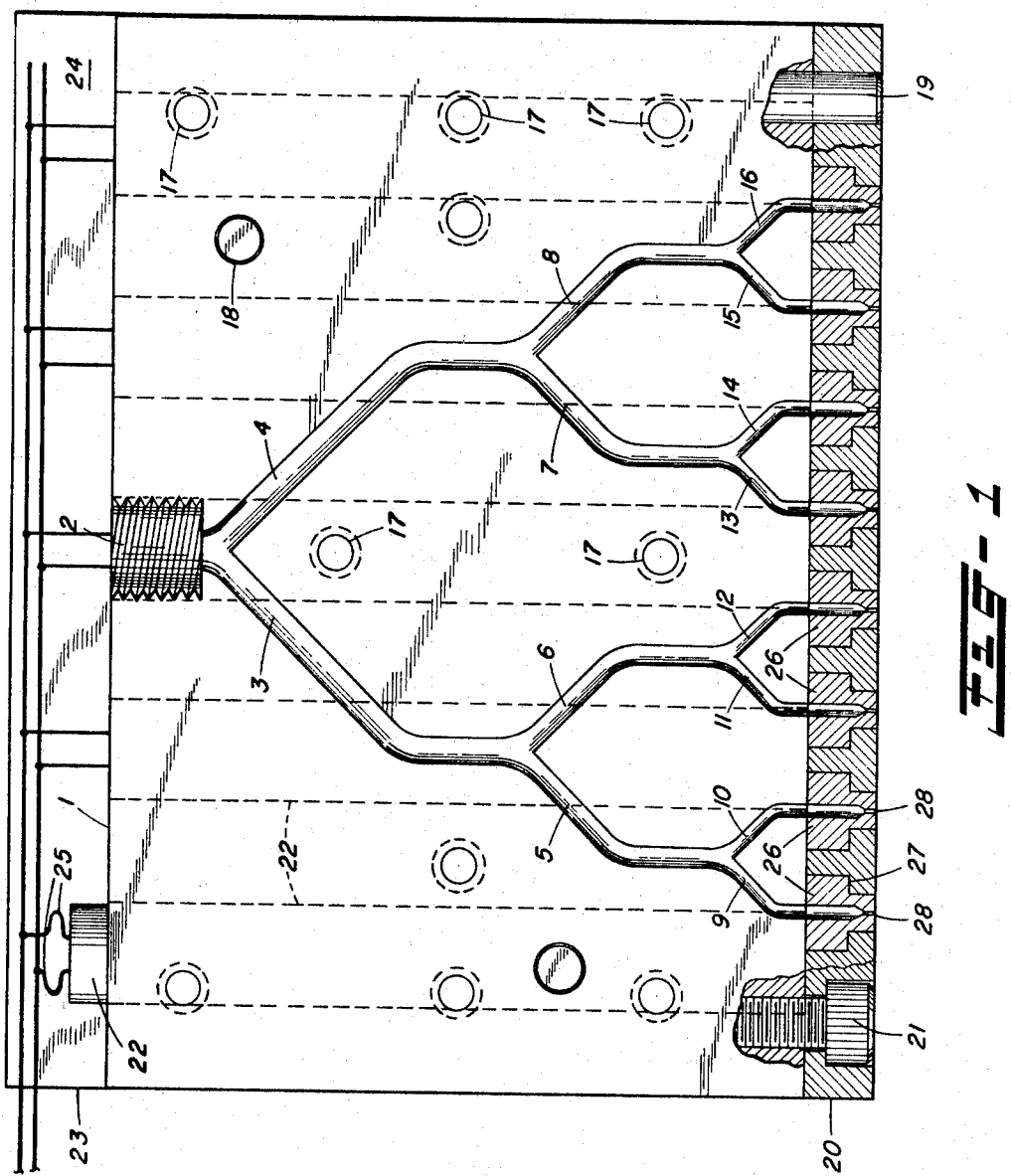

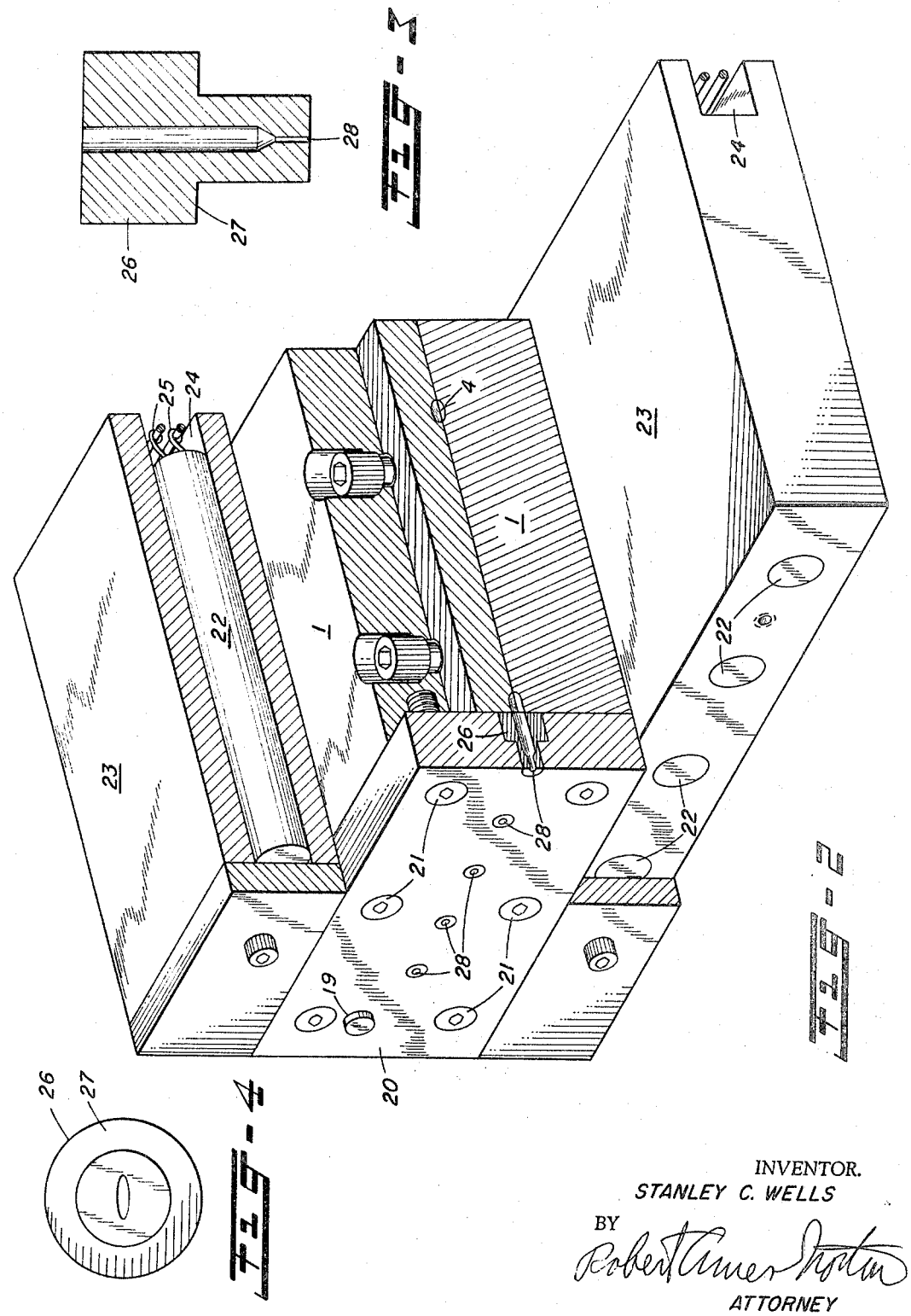

INVENTOR.
STANLEY C. WELLS
BY
*Robert Ames Norton*
ATTORNEY

United States Patent Office 3,381,336
Patented May 7, 1968

3,381,336
MELT SPINNING EXTRUSION
HEAD SYSTEM
Stanley C. Wells, Rattle Hill Road,
Southampton, Mass. 01073
Filed June 20, 1966, Ser. No. 558,858
8 Claims. (Cl. 18—8)

ABSTRACT OF THE DISCLOSURE

An extrusion head for the melt extrusion of threads is provided with a resin inlet conduit and a series of thread extrusion orifices separated from each other, the extrusion orifices being connected to the inlet conduit through channels which fork in powers of a base number, such as two, with gradual bends, the cross-sections of each forking stage being the same, whereby the die constant, K, in each channel is substantially constant. The head is provided with heating means to keep a constant temperature on the resin passing through the head, and preferably the orifices are in separate inserts. The head can conveniently be made of two blocks in which the channels are in the form of grooves which complete channels when the two blocks are bolted together.

Background of the invention

Considerable problems are presented when plastic threads are melt extruded, for example melt extruded polyurethane elastomers. Ordinarily a large number of threads are extruded from a single extrusion head, and among the problems presented are uniformity of thread size, uniform temperature across the whole of the head, and uniform flow distribution and pressures on extrusion orifices or spinnerettes. The spinnerettes may be single orifice spinnerettes for monofilament threads or groups of orifices to produce a multi-filament thread. The problems were not solved by ordinary extrusion heads, and the first attempt to extrude improved melt extruded threads is represented by the patent to Lipski, No. 3,057,-009. This patent used an extrusion head in which the melted material moved in the form of a relatively extended sheet to a series of orifices or spinnerettes which in the Lipski patent were developed as a series of needles with hollow channels. As far as the distribution of molten material to the needles was concerned, the Lipski patent utilized a series of constrictions and expansions in the final channels to the extrusion orifices. This may be considered as alternately building up back pressure and relief in the expanded portions, in order to reduce non-uniformity of pressure and flow on the orifices themselves which were of uniform size. The Lipski head represented a definite improvement in the art and may be considered as the first serious attempt to meet the problems of melt extrusion for multiple orifices or spinnerettes.

It has also been proposed to extrude a sheet of thermoplastic material, the head having a resin inlet, forking channels to expanded, slotted openings which come together and form the sheet. It should be noted that since these slots constitute extensions the cross-section of the channel is not maintained constant.

Summary of the invention

The present invention solves the problem, to which the Lipski patent was directed, by a different procedure. The general condition of fluid flow through a die is given by the following relation:

$$Q = P/K\eta$$

where $Q$ = Volume rate of flow; cu. in./sec.
$P$ = Pressure drop across the die, p.s.i.
$\eta$ = Effective resin viscosity, lb.-sec./in.$^2$
$K$ = Die constant, in.$^{-3}$, which is dependent on the flow channel geometry of the particular paths, including path length, whether a single or multiple paths.

It will be apparent that the approach taken by the Lipski patent was to maintain as nearly a constant P as possible by means of the alternate restrictions and expansion chambers. The present invention in its overall aspect accomplishes the desired result of a uniform Q, not by alternate restrictions and expansions at the orifices to maintain P as constant as possible, but a distribution system which maintains K constant. By means of the present invention it has been found to be possible to maintain this constancy of K across a large multi-orifice head with a greater degree of accuracy than was practical in maintaining a constant P by means of the Lipski invention. It will be apparent that the two systems operate under substantially different systems. So great is the precision with which K can be controlled that in practical extrusion heads it has been possible to use orifices which do not have multiple restriction and expansion zones as used in the Lipski system. This is not to say that the Lipski system cannot be used in combination with the present invention, and so in a broader aspect the present invention may be considered as applicable either to orifices without multiple contractions and expansion or with them where the ultimate in control is desired. It is, however, an advantage of the present invention that it can be used with a simpler orifice setup than is needed in the Lipski invention and adequate uniformity is obtained in practice.

It will be noted that the resin viscosity $\eta$ should be maintained as nearly completely constant as possible. This is just as necessary, and perhaps more necessary, in the present invention than in a Lipski head, and so in a subsidiary sub-combination and a more specific and preferred overall combinations, new and improved heating of the head is also included. Resin viscosity, of course, is primarily dependent on temperature. The improved heating device is of course also useful in a Lipski head.

Essentially the constancy of K, on which the present invention is based, is obtained by distribution channels for the movement of the melted resin through the head in paths of absolutely equal length to each orifice and involves a high degree of constancy of friction in each path to an extent which has not hitherto been obtained in melt extrusion heads. At the same time, the movement of the resin particles is maintained as nearly in the same direction as possible, i.e. one dimensional flow, avoiding any sharp bends. The distribution aspect of the present invention is obtained by providing paths which fork with very gentle bends. The forking is preferably in powers of 2, that is a path starts out with one channel which forks into two, each of those into two more, and so on. This makes it possible to machine the paths in the form of grooves in two blocks of metal which are then bolted together, and we may consider that the paths are proceeding essentially in the same plane, using this in a somewhat looser sense because the channels do have extensions in a third dimension. The mechanical and production advantages of the binary forking is so great that this is the preferred modification of the distribution aspect of the present invention. However, it is possible to have the paths fork in three dimensions; for example they can fork into 3's at 120° to each other. This makes for a much more expensive and complicated mechanical construction, but it operates with the same efficiency and is therefore included in the present invention, although the present state of the art in producing smooth channels makes the binary forking, which can be effected in a simpler way, preferable.

Reference has been made to constancy of friction in each path. This does not mean that the channels have to be of the same dimension all the way through the head. For example, where the resin enters in a single conduit centrally the first fork may have paths of larger cross section than when these fork and so on. As a matter of fact, there is some advantage in having the channels become progressively smaller with each forking. However, considering any one channel through the head, the length and cross sections of each portion are the same, so that K is constant for each channel to a very high degree.

The present invention may utilize a single head and mechanically this is very efficient and can be used with a large number of orifices, such as 64, 128, and the like. However, the principles of the present invention are also applicable to installations which use multiple heads, of course always in 2's or 3's or other numbers, depending on the forking system decided on. Naturally, of course, the two channels going to two heads, if a two-head setup is used, must be of the same size and of the same length. The possibility of using multiple heads is a very practical advantage of the present invention as it adds a desirable flexibility for extrusion systems of different sizes. It should be noted that when multiple heads are used, it is not essential that the forking be by two's throughout. For example, three heads may be provided with the conduits going to them forking in three dimensions at 120° to each other, whereas in each head the forking may be binary, with the practical advantage of simple machining which has been referred to above.

Although with good mechanical design and uniform smoothness of channels a high degree of constancy of K can be achieved, it may not be absolutely perfect, and so the present invention includes in another aspect and in a separate sub-combination an improved extrusion orifice plate with removable orifice inserts. This has many advantages. First of all, the individual inserts can be more easily precision bored and if there is any slight departure from absolute constancy of K over each path in the distribution system in the head, this can be compensated for when a head is first installed by slight modification of the bores in some of the individual orifices for of course the bores in the orifice are a part of the path through which the molten resin flows and therefore contribute to the overall K for each path. This makes it possible to adjust the K to almost absolute constancy, far greater than anything that has been achievable in extrusion systems for melt extrusion up to the present time.

The new orifice plates with removable but locked individual orifice elements also have two other practical advantages. First of all, any damage to an individual orifice requires only the replacement of a cheap single orifice element, whereas in the orifice plates which were used hitherto the whole plate has to be discarded, with a resulting greatly increased economic loss. The second advantage is that it is possible to use the same head for extruding different threads. For example, the cross section of the threads may be changed. All that is needed is to insert and lock in a new set of removable orifice elements. It is also much easier to machine different profiles to the individual orifice elements. For example, instead of a round thread, which is the most common shape, the thread may be oval for certain uses or may even have other profiles, such as square threads or other polygonal shaped threads.

At first glance it might be thought that it would be ridiculous ever to extrude threads with edges, such as square threads and the like. However, there are certain uses where a square thread is desirable. For example, in the Bellmore Patent No. 3,213,893, there is described a weave in which some uncovered edged elastic threads are woven in a leno weave causing twisting of them, which increases the friction on the human skin and has advantages for such uses as brassiere straps and the like which are desired to have sufficient friction so that they will not slide off a shoulder. When such a weave is desired, it is possible to have square or rectangular extruded elastomers by suitable orifice elements of the new orifice plate aspect of the present invention. This opens the field for such shaped threads to those produced by extrusion processes, which in the past was not considered economically practical because of the great cost and difficulty in producing the corresponding profiled orifices in orifice plates with large numbers of orifices. For this reason, where square or rectangular elastic threads were used it was customary to obtain them by cutting. The locked-in, separate orifice element orifice plates of the present invention now make it economically practical to produce threads of these profiles by extrusion. Another use of square or rectangular thread is the formation of temporary ribbon in which the threads are caused to lightly adhere to each other and then be shipped in ribbons, with much more economical packing than is possible for an individual thread. The user then can unwind the threads when they are to be used, and where such threads are desired, this makes possible further economies.

The separate element, locked orifices in the plates of the present invention are in no sense limited to use with the uniform K distribution heads which forms another part of the present invention and provides for constant K. On the contrary, the new orifice plates may be used with other extrusion heads, such as for example a Lipski type extrusion head. In such a case it is a relatively simple matter to machine the alternate contractions and expansions in the separate elements in the orifice plate, which are needed in order to produce the effect of constant P on which the Lipski system is based. The great flexibility of the new removable orifice element orifice plate of the present invention is also combined with an economic construction. The machining costs where individual elements are usable are considerably less where the same degree of precision is attempted in an orifice plate having a large number of orifices integral therewith. At the same time, the locking of the individual orifice elements retain the advantages of an integral orifice plate. This part of the present invention presents the somewhat unusual and happy situation of an improved device what at the same time is as economical or more economical to produce.

*Brief description of the drawings*

FIG. 1 is a plan view of one-half of a distribution plate with the removable orifice plate attached, the latter being shown in section;

FIG. 2 is a typical composite section through the assembly of heater blocks, distribution plates and orifice plate;

FIG. 3 is a sectional view of orifice insert for removable orifice plate shown with a typical flow channel;

FIG. 4 is an end view of a modified orifice element for oval threads;

*Description of the preferred embodiments*

Figure 5:
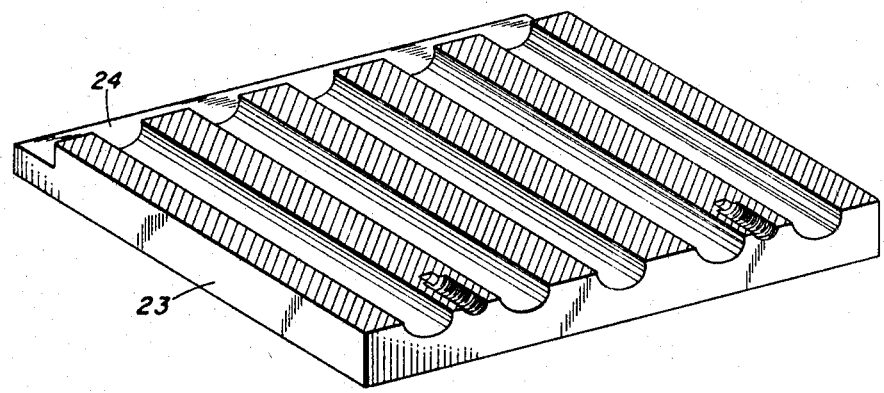
FIG. 5 is an isometric view of a heater block which is also shown, partly in section, in FIG. 2.

The head illustrated in FIGS. 1 and 2 is made up of two blocks of steel 1, one of which is shown in plan view on FIG. 1. Resin comes in through a threaded conduit 2 and the path then forks in two paths 3 and 4, which are formed of course by the two grooves when the blocks 1 are joined together by the bolts 17 and aligning pins 18.

The channels 3 and 4 bend gradually and then fork into somewhat smaller channels 5, 6, 7, and 8, which again after gentle bends fork into the final channels 9, 10, 11, 12, 13, 14, 15 and 16. An orifice plate 20 is aligned on the plates 1 by locating pins 19 and is bolted to the face of the blocks 1 by cap screws 21. Uniform heating is effected by aluminum heater blocks 23 on the outsides of each block 1 as shown in FIG. 2. These heater blocks are shown in an isometric view in FIG. 5 and are provided with cartridge heaters 22. The locations of the cartridge heaters are shown in phantom on FIG. 1, and it will be seen that the edges of the heaters symmetrically are disposed along the outside of the conduits 9, 10, 11, 12, 13, 14 and 16. The heaters are in large, thick aluminum blocks 23, and the high heat conductivity of the aluminum assures almost perfect uniformity of temperature throughout the blocks 1. The block 23 is provided with a channel 24 in which the wires from the cartridge heaters 25 are connected to a single heating lead at one end of the channel. The side edges and top edge of the blocks 1 are provided with insulation (not shown), and this further assures uniformity of temperature.

Each of the conduits 9 to 16 extends into a removable orifice element 26, shown in section in FIG. 3 provided with a shoulder 27 contacting corresponding shoulders in the plate. Each removable orifice element has a central bore of two sizes, the front portion 28 constituting the final extrusion orifice. This will be seen clearly in FIG. 1. The shape of the orifice shown in FIG. 4 illustrates a different shape, namely an oval. When the head is assembled, it is tested for uniform extrusion, and any slight differences can be compensated by changing slightly the bores in the corresponding orifice elements as has been described above. Finally an almost perfect uniformity of extrusion is obtained. Variations in friction in the paths are reduced to a minimum by the very gradual bends and by producing a reasonably good mirror finish on the grooves which form the channels.

FIG. 1 shows an extrusion head with only eight orifices in order not to confuse the drawing. Such a head is useful for experimental machines, but in general production machines will have heads with many more orifices, for example 64 or 128. In the first case there would be a total of six forkings and in the second case seven forkings, which still retain the great uniformity of K for each path from resin inlet to orifice in the respective orifice elements. If more than one head is to be operated in parallel, for example two or four, the conduits entering into the threaded openings 2 in each head are also forked in the same manner with gradual bends and their inner surface is also finished to a good mirror finish. Insulation is of course, supplied to the conduits so that the temperature of the resin going into the different heads is maintained reasonably constant, which reduces the load on the heater blocks, which otherwise would have to equalize quite different resin temperatures.

Figure 6:
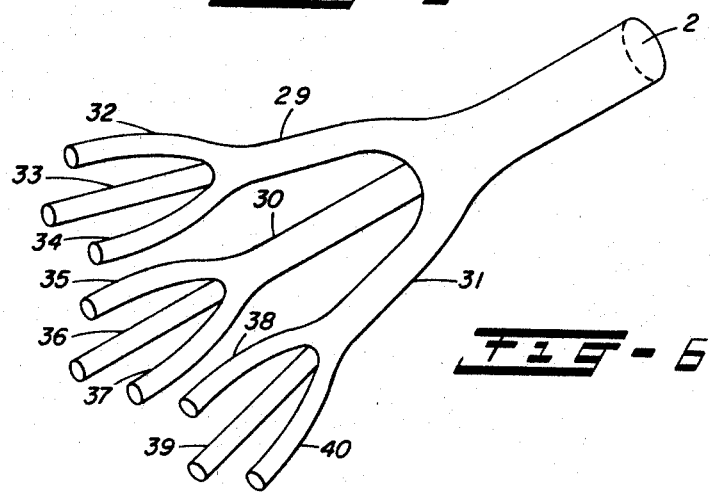
FIG. 6 is a diagrammatic representation of a three dimensional forking by 3's.
Figure 7:
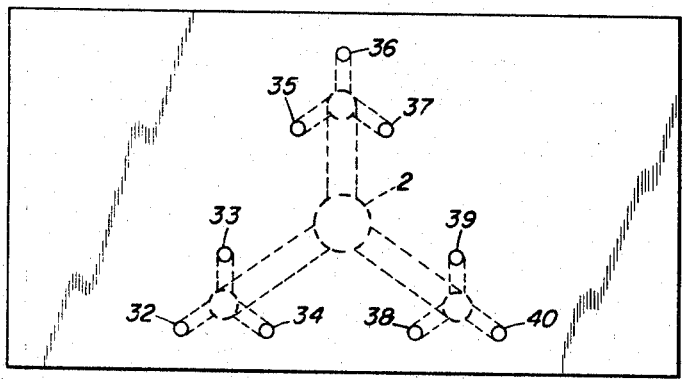
FIG. 7 is a face elevation of the edge of the distribution system of FIG. 6.

FIG. 6 illustrates diagrammatically, channels only, paths which fork in 3's in three dimensional space, only two forkings being illustrated. The resin inlet is numbered 2 as in FIG. 1, the first triple forking producing channels 29, 30 and 31, which then again fork in 3's to produce the channels 32, 33, 34, 35, 36, 37, 38, 39 and 40. It will be apparent from FIG. 7 that the forkings for the final nine channels are at 120° to each other in the face of the distribution block 41. It will also be obvious that when an orifice plate is attached, the orifice elements must be staggered in the third dimension to match the conduits from the distribution block.

I claim:
1. A melt extrusion head system for threads comprising,

(a) a source of molten extrudable material,
(b) a series of thread-extruding orifices separated from each other by distances large compared to orifice cross-section,
(c) resin channels from the source to the thread extruding orifices forking in powers of a base number with gradual bends, the cross sections of each forking stage being the same, whereby the die constant K in each channel is substantially constant, and the individual thread extruding orifices are accurately dimensioned so that the die constants K remain substantially constant through and including each thread extruding orifice, and
(d) means for maintaining the channels in the extrusion head at a constant temperature for each path.

2. A melt extrusion head system according to claim 1 in which the channels fork in powers of two.

3. A melt extrusion head system according to claim 2 in which the channels are formed as grooves in two metal blocks which are rigidly fastened together so that the grooves form the channels.

4. A melt extrusion head system according to claim 1 in which the head is in contact with a thick block of material of high heat conductivity provided with heating elements distributed symmetrically with respect to the final forking of the channels.

5. A melt extrusion head system according to claim 2 in which the head is in contact with a thick block of material of high heat conductivity provided with heating elements distributed symmetrically with respect to the final forking of the channels.

6. An extrusion head according to claim 5 in which the material of high heat conductivity is aluminum.

7. An extrusion head system according to claim 1 in which the thread extruding orifices are in separate elements and the head is provided with a block dimensioned to receive the separate elements of the thread extrusion orifices and cooperating locking elements for locking the elements into a unitary whole, the final forking resin channels mating with the orifice elements.

8. An extrusion head system according to claim 2 in which the thread extruding orifices are in separate elements and the head is provided with a block dimensioned to receive the separate elements of the thread extrusion orifices and cooperating locking elements for locking the elements into a unitary whole, the final forking resin channels mating with the orifice elements.

References Cited

UNITED STATES PATENTS

| 1,310,509 | 7/1919 | Specht | 18—8 |
| 1,788,660 | 1/1931 | Colomb | 18—8 |
| 2,541,201 | 2/1951 | Buecken et al. | 18—12 |
| 2,734,224 | 2/1956 | Winstead | 18—12 |
| 3,006,026 | 10/1961 | Martin et al. | 18—8 |
| 3,308,504 | 3/1967 | Shichman | 18—8 |
| 3,317,958 | 5/1967 | Stroup et al. | 18—12 |

FOREIGN PATENTS

| 493,608 | 3/1930 | Germany. |
| 167,559 | 4/1955 | Australia. |

OTHER REFERENCES

German Printed Application, Ser. No. 1,156,967, November 1963.

WILLIAM J. STEPHENSON, *Primary Examiner.*